(12) United States Patent
Ogden

(10) Patent No.: US 10,994,801 B2
(45) Date of Patent: May 4, 2021

(54) AUXILIARY BICYCLE TRANSMISSION

(71) Applicant: Dan Ogden, Jesup, GA (US)

(72) Inventor: Dan Ogden, Jesup, GA (US)

( * ) Notice: Subject to any disclaimer, the term of this patent is extended or adjusted under 35 U.S.C. 154(b) by 316 days.

(21) Appl. No.: 15/955,763

(22) Filed: Apr. 18, 2018

(65) Prior Publication Data

US 2018/0304964 A1 Oct. 25, 2018

Related U.S. Application Data

(60) Provisional application No. 62/489,491, filed on Apr. 25, 2017.

(51) Int. Cl.
*B62M 1/12* (2006.01)
*B62K 3/04* (2006.01)
*F16H 19/06* (2006.01)
*F16H 31/00* (2006.01)
*B62K 15/00* (2006.01)
*B62K 17/00* (2006.01)

(52) U.S. Cl.
CPC ............ *B62M 1/12* (2013.01); *B62K 3/04* (2013.01); *B62K 15/00* (2013.01); *B62K 17/00* (2013.01); *F16H 19/0622* (2013.01); *F16H 19/0672* (2013.01); *F16H 31/001* (2013.01)

(58) Field of Classification Search
CPC . B62M 1/12; B62M 1/24; B62M 1/26; B62M 1/28; B62M 1/30; B62K 3/04; B62K 3/005; F16H 19/0622; F16H 19/0672; F16H 31/001
See application file for complete search history.

(56) References Cited

U.S. PATENT DOCUMENTS

| | | | | |
|---|---|---|---|---|
| 577,895 | A | * 3/1897 | Wales | B62M 1/12 280/234 |
| 581,985 | A | * 5/1897 | Fritz | B62M 1/12 280/234 |
| 1,020,432 | A | * 3/1912 | McBarnes | B62M 1/12 280/234 |

(Continued)

FOREIGN PATENT DOCUMENTS

| | | |
|---|---|---|
| CN | 2928657 | 8/2007 |
| CN | 206068025 | 4/2017 |

OTHER PUBLICATIONS the International Search Report and Written Opinion issued by the U.S. Patent & Trademark Office as International Search Authority dated Jul. 6, 2018; 7 pages.

(Continued)

*Primary Examiner* — Minnah L Seoh
*Assistant Examiner* — Maurice L Williams
(74) *Attorney, Agent, or Firm* — Smith, Gambrell & Russell LLP

(57) ABSTRACT

An auxiliary bicycle transmission for a bicycle has a crossbar formed by a telescoping bar slidably mounted in an outer channel member. One end of a half chain or half V-belt is connected to the telescoping bar, the other end is connected by means of a spring to the upper end of a down tube, and the chain or V-belt that engages a freewheeling sprocket or pulley so that when the telescoping bar extends out of the outer channel member against the spring force, the freewheeling sprocket rotates and provides additional motive force to the standard transmission of the bicycle.

10 Claims, 16 Drawing Sheets

(56) References Cited

U.S. PATENT DOCUMENTS

| | | | | |
|---|---|---|---|---|
| 2,012,534 A * | 8/1935 | Hendricks | ............... | B62M 1/24 280/257 |
| 2,993,709 A * | 7/1961 | Wick | ............... | B62J 1/08 280/287 |
| 3,485,508 A * | 12/1969 | Hudnall | ............... | B62K 3/00 280/234 |
| 3,920,263 A * | 11/1975 | Bundschuh | ............... | B62K 5/00 280/236 |
| 3,921,464 A * | 11/1975 | Greseth | ............... | B62M 1/12 74/37 |
| 4,227,712 A * | 10/1980 | Dick | ............... | B62M 1/28 280/236 |
| 4,271,712 A * | 6/1981 | White | ............... | B62M 1/28 280/251 |
| 4,548,420 A * | 10/1985 | Patroni, Jr. | ............... | B62M 1/16 280/224 |
| 4,600,206 A * | 7/1986 | Di Paolo | ............... | B62K 13/00 280/231 |
| 4,639,007 A * | 1/1987 | Lawrence | ............... | B62M 1/12 280/233 |
| 4,909,537 A * | 3/1990 | Tratner | ............... | B62K 13/00 280/278 |
| 4,928,986 A * | 5/1990 | Carpenter | ............... | B62M 1/12 280/234 |
| 5,372,374 A * | 12/1994 | Hudson | ............... | B62M 1/12 280/233 |
| 5,385,359 A * | 1/1995 | Ehrbar | ............... | B62J 1/28 280/234 |
| 5,429,379 A | 7/1995 | Grigoriev | | |
| 5,775,708 A | 7/1998 | Heath | | |
| 5,785,337 A * | 7/1998 | Ming | ............... | B62M 1/32 280/251 |
| 5,833,256 A * | 11/1998 | Gilmore | ............... | B62K 3/005 280/224 |
| 6,688,623 B1 * | 2/2004 | Yunaska | ............... | B62M 1/12 280/233 |
| 7,896,375 B2 * | 3/2011 | Cynn | ............... | B62M 1/12 280/230 |
| 8,534,404 B2 * | 9/2013 | Juan | ............... | B60K 6/00 180/165 |
| 8,864,159 B2 * | 10/2014 | Scolari | ............... | B62K 3/02 280/220 |
| 9,409,621 B2 * | 8/2016 | Hunt | ............... | B62M 1/12 |
| 9,487,262 B2 * | 11/2016 | Chao | ............... | B62J 1/08 |
| 10,569,827 B2 * | 2/2020 | Felker | ............... | F16H 19/04 |
| 2004/0245743 A1 | 12/2004 | Chao | | |
| 2008/0129008 A1 * | 6/2008 | Tarasov | ............... | B62M 1/12 280/243 |
| 2011/0057413 A1 * | 3/2011 | Lee | ............... | B62K 15/00 280/278 |
| 2011/0148068 A1 | 6/2011 | Hunt | | |
| 2012/0061938 A1 * | 3/2012 | Lillo | ............... | B62M 15/00 280/221 |
| 2014/0049022 A1 * | 2/2014 | Dopf | ............... | B62K 19/18 280/278 |
| 2015/0217822 A1 * | 8/2015 | Sturdevant | ............... | B62H 1/06 280/298 |

OTHER PUBLICATIONS

The First Office Action dated Sep. 18, 2020 by the Chinese Patent Office for corresponding Chinese Patent Application No. 2018800252403; 12 pages.

* cited by examiner

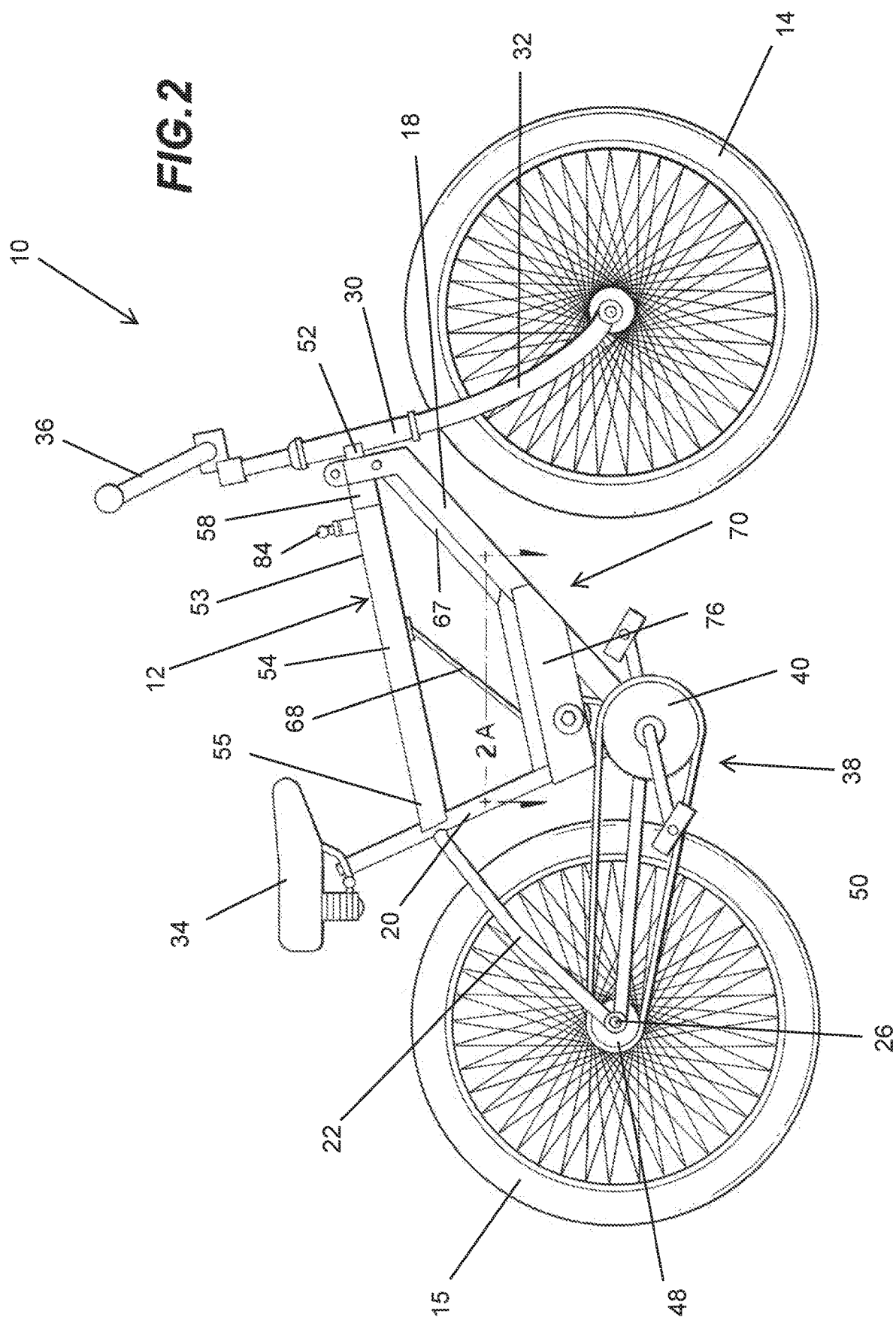

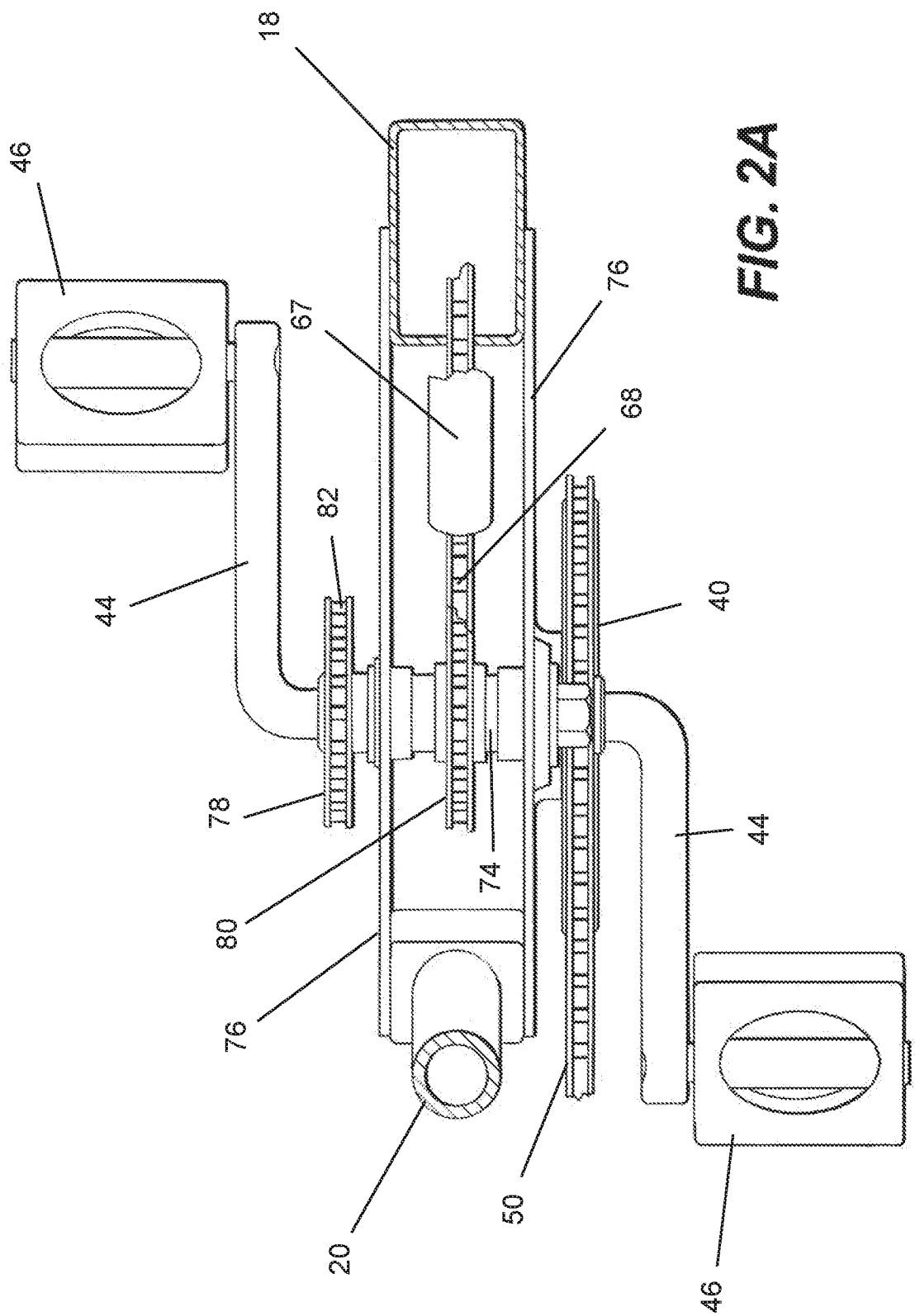

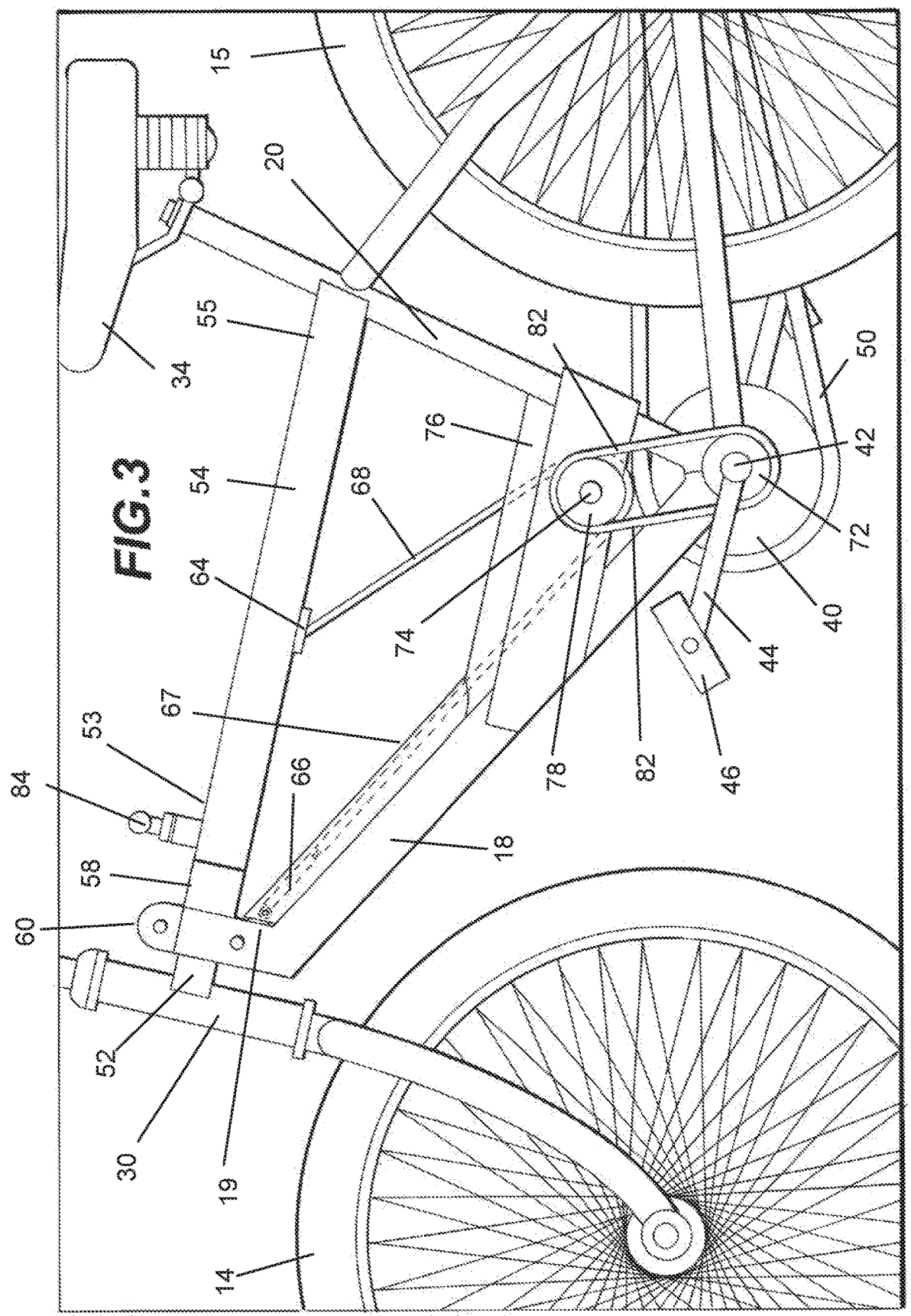

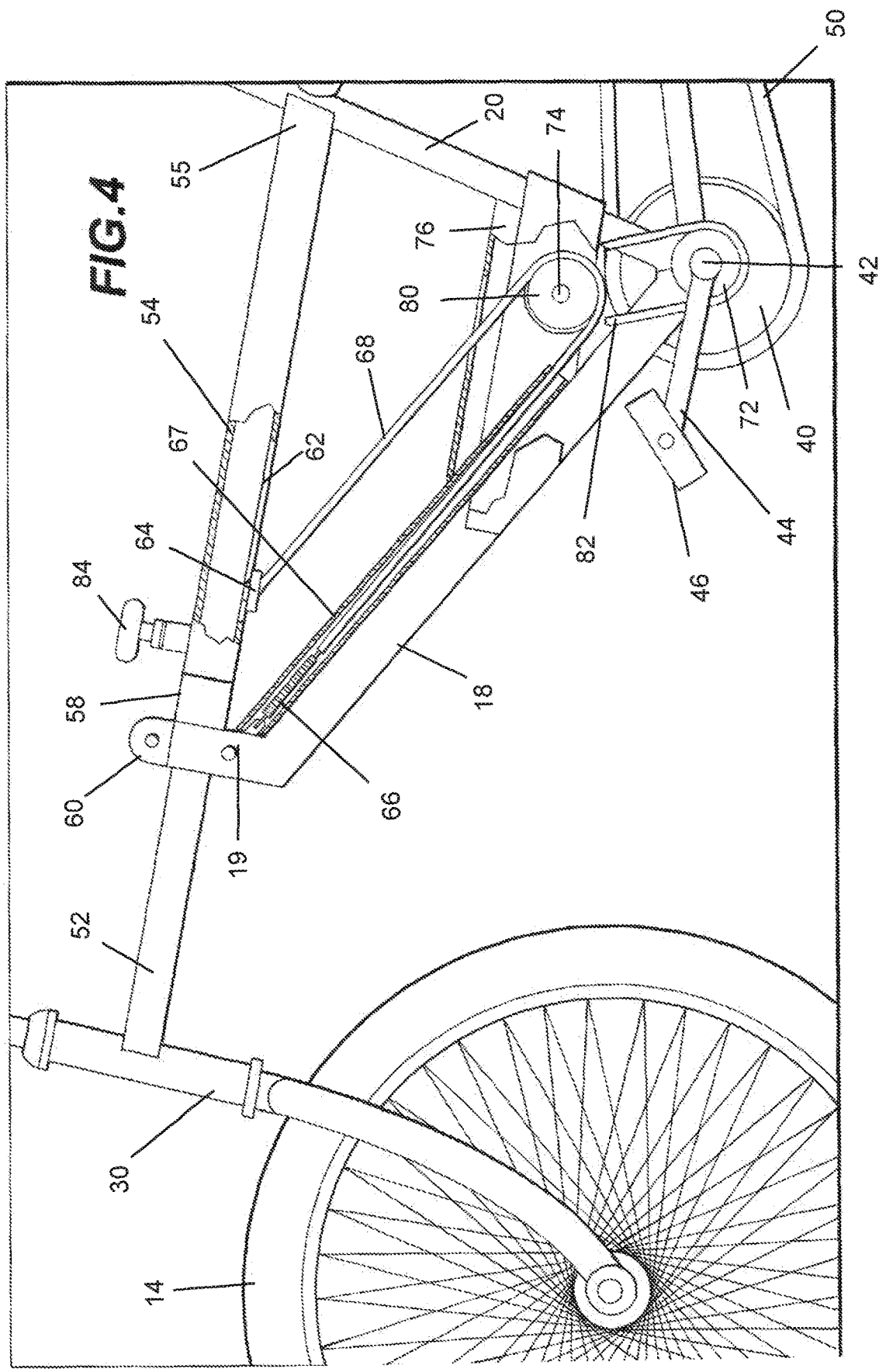

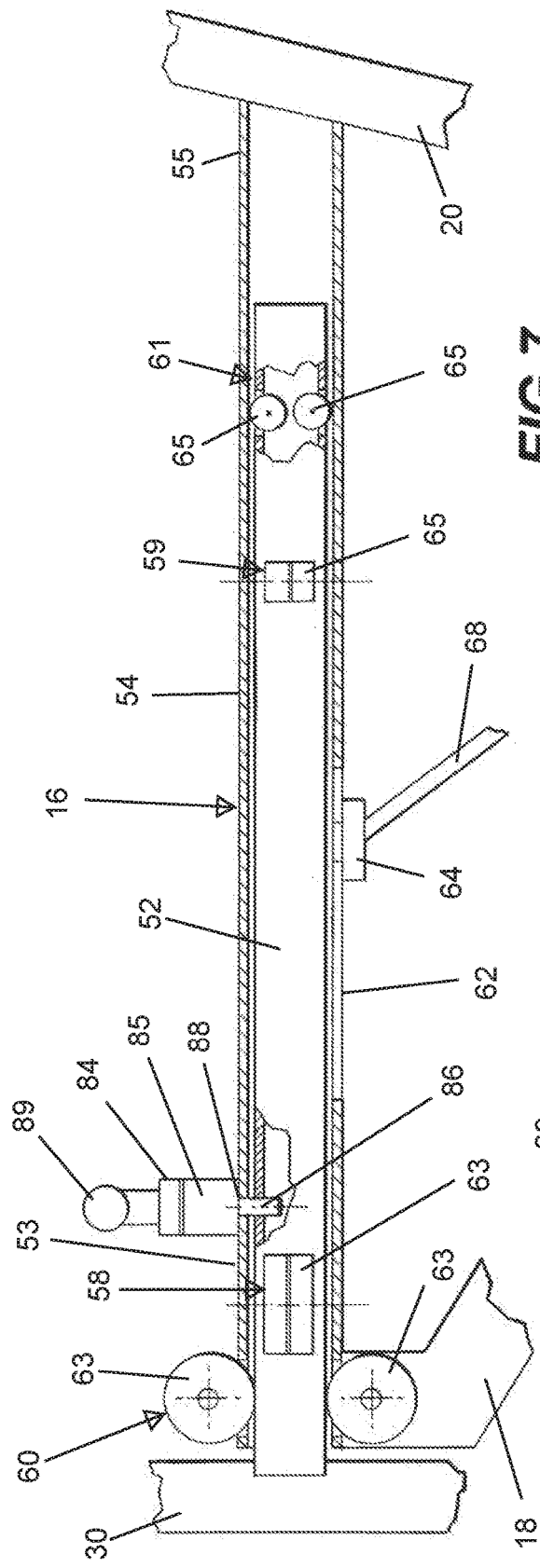

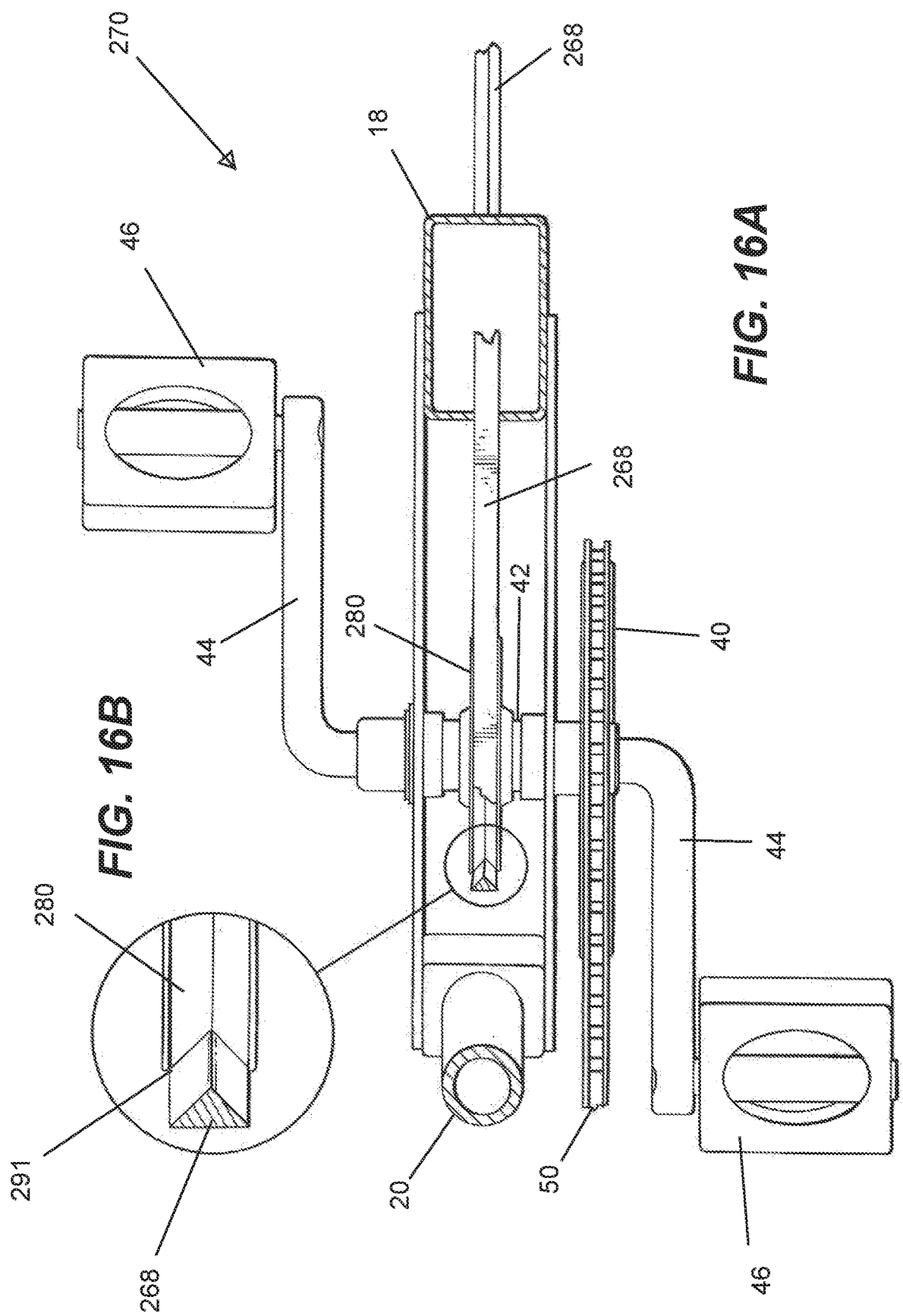

AUXILIARY BICYCLE TRANSMISSION

CLAIM OF PRIORITY

This application claims priority from U.S. Provisional Patent Application Ser. No. 62/489,491, filed on Apr. 25, 2017, which is incorporated herein in its entirety.

FIELD OF THE INVENTION

This invention relates to a bicycle transmission, and more particularly to an auxiliary bicycle transmission.

BACKGROUND OF THE INVENTION

With a conventional bicycle, torque is transmitted from pedals, cranks, and attached sprocket through a drive chain to a freewheeling sprocket mounted to the rear wheel of the bicycle. All of the motive force for the bicycle is generated by the rider pushing and/or pulling the pedals with the rider's legs. Consequently, when a person uses conventional bicycle riding as an exercise option, the rider does not gain any substantial exercise for the rider's arms and upper body.

The prior art discloses bicycles that have essentially handles, cranks, and attached sprocket mounted on the handlebars of the bicycle. Consequently, the rider uses both the rider's arms and legs to propel the bicycle. While such an arrangement provides additional exercise for the rider's arms and upper body and additional motive force to propel the bicycle, using such a rotating handle and crank arrangement can interfere with the rider safely steering the bicycle.

SUMMARY OF THE INVENTION

The auxiliary bicycle transmission of the present invention overcomes the exercise deficiency of conventional bicycles and overcomes the safety and steering problems encountered with prior art bicycles with auxiliary hand crank transmission systems.

Particularly, the auxiliary bicycle transmission of the present invention employs a telescoping crossbar with an inner telescoping bar and an outer channel member in place of the standard crossbar of the conventional bicycle. The front end of the telescoping bar is attached to the head tube of the bicycle. The rear end of the outer channel member is attached to the seat tube of the bicycle. The telescoping bar slides on bearings either mounted outside of the outer channel member at either end or within the outer channel member. The outer channel member has a slot running the length of the outer channel member on its lower side. A bracket is attached to the bottom of the telescoping bar and protrudes through the slot in the bottom of the outer channel member.

In one embodiment the bracket is attached to one end of a half chain. In a second embodiment, the bracket is attached to a half V-belt. In the first embodiment, the half chain engages an upper freewheeling sprocket, and the other end of the half chain is attached through an extension spring to the front end of the outer channel member. The upper freewheeling sprocket shares a common shaft with an upper standard sprocket. The upper standard sprocket is connected by a continuous chain to a lower freewheeling sprocket that is mounted to the pedal shaft of the bicycle. In an alternative arrangement, the freewheeling sprocket could be mounted directly on the pedal shaft of the bicycle.

In the second embodiment, the half V-belt engages an upper freewheeling pulley, and the other end of the half V-belt is attached through an extension spring to the front end of the outer channel member. The upper freewheeling pulley shares a common shaft with an upper standard sprocket. The upper standard sprocket is connected by a continuous chain to a lower freewheeling sprocket that is mounted to the pedal shaft of the bicycle. When the telescoping bar is in its retracted position, the half V-belt is slack around the freewheeling pulley thereby allowing the freewheeling pulley to rotate in either direction without interference from the half V-belt. In an alternative arrangement, the freewheeling pulley could be mounted directly on the pedal shaft of the bicycle.

With the telescoping bar retracted into the outer channel member and locked together by means of a lock, the bicycle of the present invention can be ridden in the same manner as a conventional bicycle. In order to engage the auxiliary transmission of the present invention, the rider disengages the lock and pushes forward on the handlebars to extend the telescoping bar out of the outer channel member. As the telescoping bar extends forward out of the outer channel member, the bracket mounted to the bottom of the telescoping bar pulls the half chain or half V-belt forward against the spring attached to the other end of the half chain or half V-belt. As the half chain or half V-belt is pulled forward by the bracket mounted to the telescoping bar, the half chain causes the upper freewheeling sprocket to rotate or the half V-belt causes the upper freewheeling pulley to rotate. The rotation of the upper freewheeling sprocket or freewheeling pulley is connected through the upper standard sprocket, the continuous chain, and the lower freewheeling sprocket attached to the pedal shaft of the bicycle. The rotation is then transmitted in a standard fashion from the pedal shaft to the pedal chain sprocket, to the main drive chain, and to the rear wheel sprocket attached to the rear wheel of the bicycle.

Once the telescoping bar has been extended and the rider releases the forward force on the handlebars, the tension spring attached at one end to the front of the outer channel member pulls the half chain or half V-belt in the opposite direction thereby returning the telescoping bar to its retracted position inside the outer channel member. As the telescoping bar retracts into the outer channel member, the upper freewheeling sprocket or upper freewheeling pulley attached respectively to the half chain or half V-belt rotates in the opposite direction in a freewheeling fashion so that the reverse rotation is not connected through the auxiliary transmission to the pedal shaft of the bicycle.

By continuously extending and retracting the telescoping bar, the rider not only exercises the rider's arms and upper body, but also provides additional motive force to the bicycle thereby increasing the speed of the bicycle.

Further objects, features and advantages will become apparent upon consideration of the following detailed description of the invention when taken in conjunction with the drawings and the appended claims.

BRIEF DESCRIPTION OF THE DRAWINGS

FIG. 2 is right side elevation of the bicycle in accordance with the present invention.

FIG. 2A is a top section view of the bicycle in accordance with the present invention has seen along line 2A-2A of FIG. 2.

FIG. 3 is an enlarged left side elevation view of the bicycle, with the telescoping bar retracted, in accordance with the present invention.

FIG. 4 is an enlarged left side elevation view of the bicycle, with the telescoping bar extended, in accordance with the present invention.

FIG. 7 is a side elevation section view of the crossbar of the bicycle with the telescoping bar retracted in accordance with the present invention.

FIG. 8 is side elevation section view of the crossbar of the bicycle with the telescoping bar extended in accordance with the present invention.

FIG. 16A is a top section view of the bicycle in accordance with the present invention has seen along line 16-16 of FIG. 14 with the telescoping bar retracted.

FIG. 16B is a detail view of a portion of the top section view of FIG. 16A.

DETAILED DESCRIPTION OF THE PREFERRED EMBODIMENT

Figure 1:
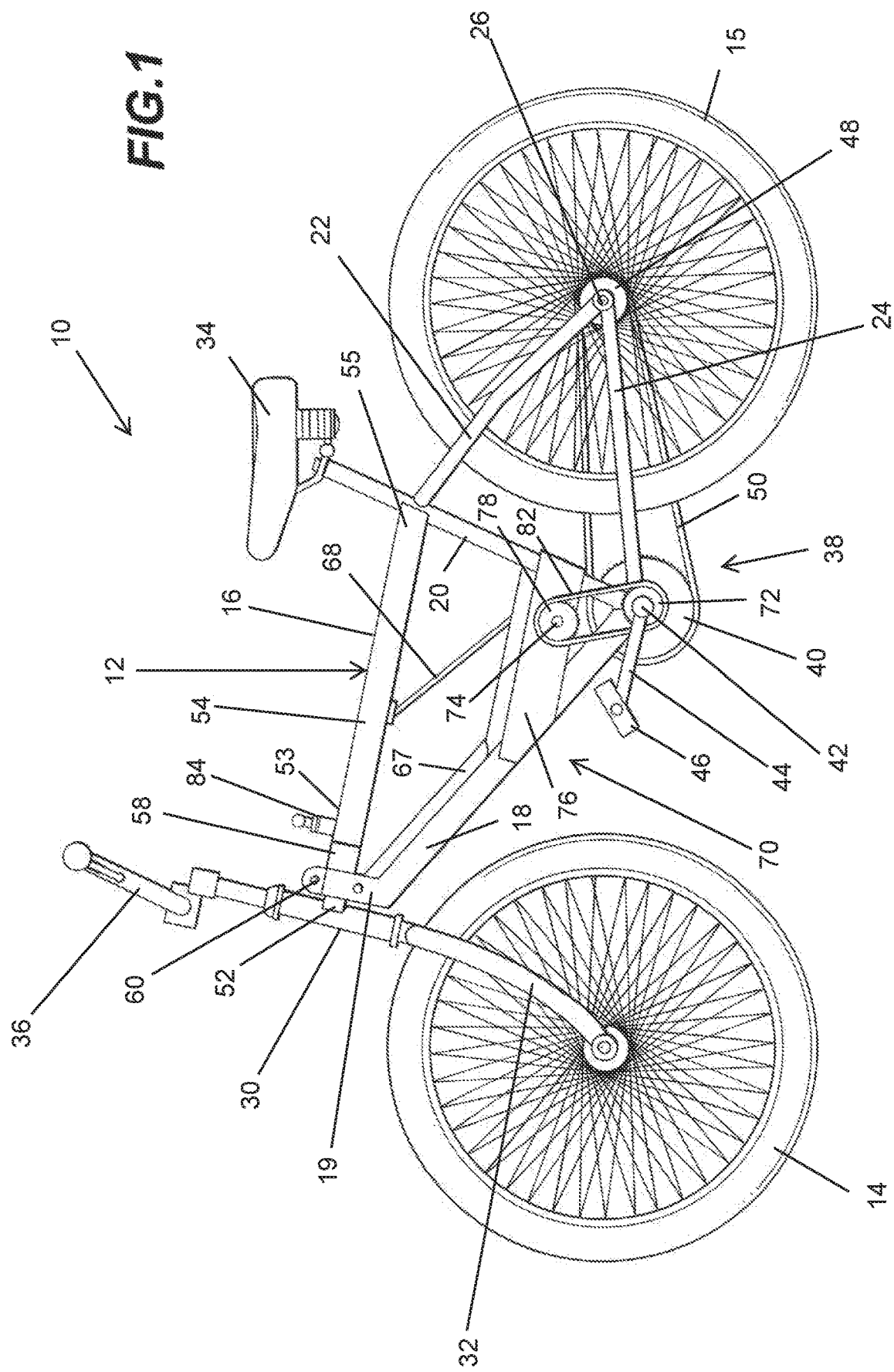
FIG. 1 is a left side elevation view of a first embodiment of a bicycle in accordance with the present invention.

With reference to FIG. 1, a bicycle 10, in accordance the present invention, includes a frame 12, a front wheel 14, a rear wheel 15, a seat 34, handlebars 36, and a conventional chain transmission 38. The frame 12 includes a crossbar 16, a down tube 18, a seat tube 20, seat stays 22, chain stays 24, a rear wheel mount 26, a head tube 30, and a front fork 32. In conventional fashion, the front wheel 14 is mounted to the fork 32, and the fork 32 extends through the head tube 30 and connects to the handlebars 36. Also in conventional fashion, the rear wheel 15 is mounted to the rear wheel mount 26. Further, in conventional fashion, the rear wheel 15 is driven by the standard chain transmission 38. The seat 34 is mounted on the seat tube 20 of the frame 12.

The standard chain transmission 38 includes pedals 46, cranks 44, and a pedal chain sprocket 40 attached to a pedal shaft 42. A freewheeling rear wheel sprocket 48 is connected to the rear wheel 15. A main drive chain 50 connects the pedal chain sprocket 40 to the freewheeling (overrunning clutch) rear wheel sprocket 48. When the rider pushes on the pedals 46 and imparts rotary motion to the pedal chain sprocket 40, the pedal chain sprocket 40 drives the main drive chain 50, which in turn rotates the freewheeling rear wheel sprocket 48 and drives the bicycle 10 forward.

The bicycle 10 of the present invention further includes an auxiliary transmission 70 that harnesses energy from the rider's arms and upper body in order to provide additional exercise for the rider and to add additional motive force to propel the bicycle 10 forward. In accordance with the present invention the crossbar 16 of the auxiliary transmission 70 comprises a telescoping bar 52 slidably mounted within an outer channel member 54. The telescoping bar 52 is only slightly longer than the outer channel 54 member. The combination of the telescoping bar 52 and the outer channel member 54 replace the standard crossbar 16 in a conventional bicycle. The rear end 55 of the outer channel member 54 is attached to the seat tube 20, and the front end 53 of the outer channel member 54 is attached to the upper end 19 of the down tube 18. The outer channel member 54 has a slot 62 (FIGS. 4, 7, and 8) extending along a portion of the length of the bottom of the outer channel member 54. The slot 62 is located adjacent the front end 53 of the outer channel member 54 and extends between 10 inches and 12 inches toward the rear end 55 of the outer channel member 54.

Figure 5:
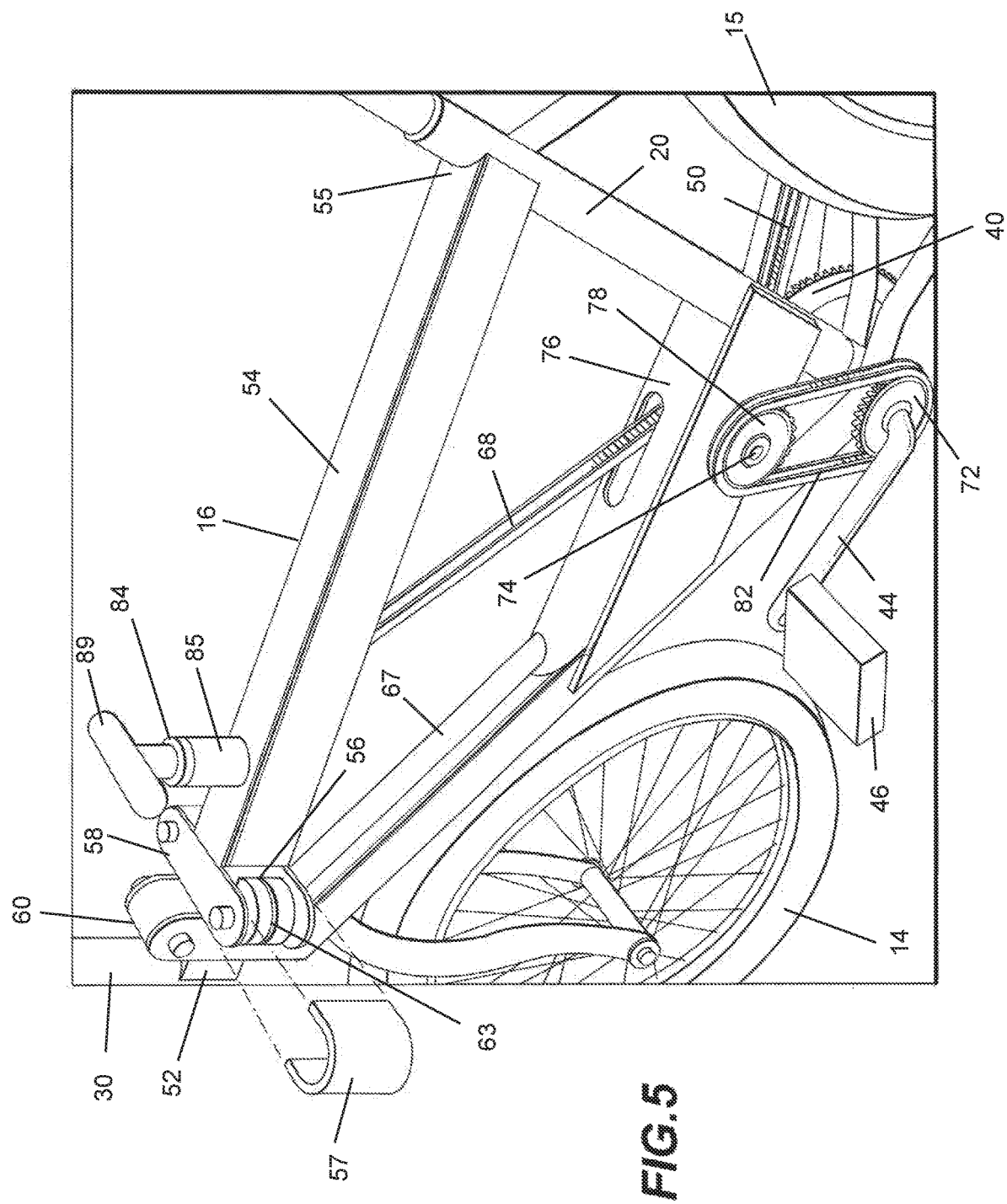
FIG. 5 is an enlarged left side perspective view of the bicycle, with the telescoping bar retracted, in accordance with the present invention.
Figure 9:
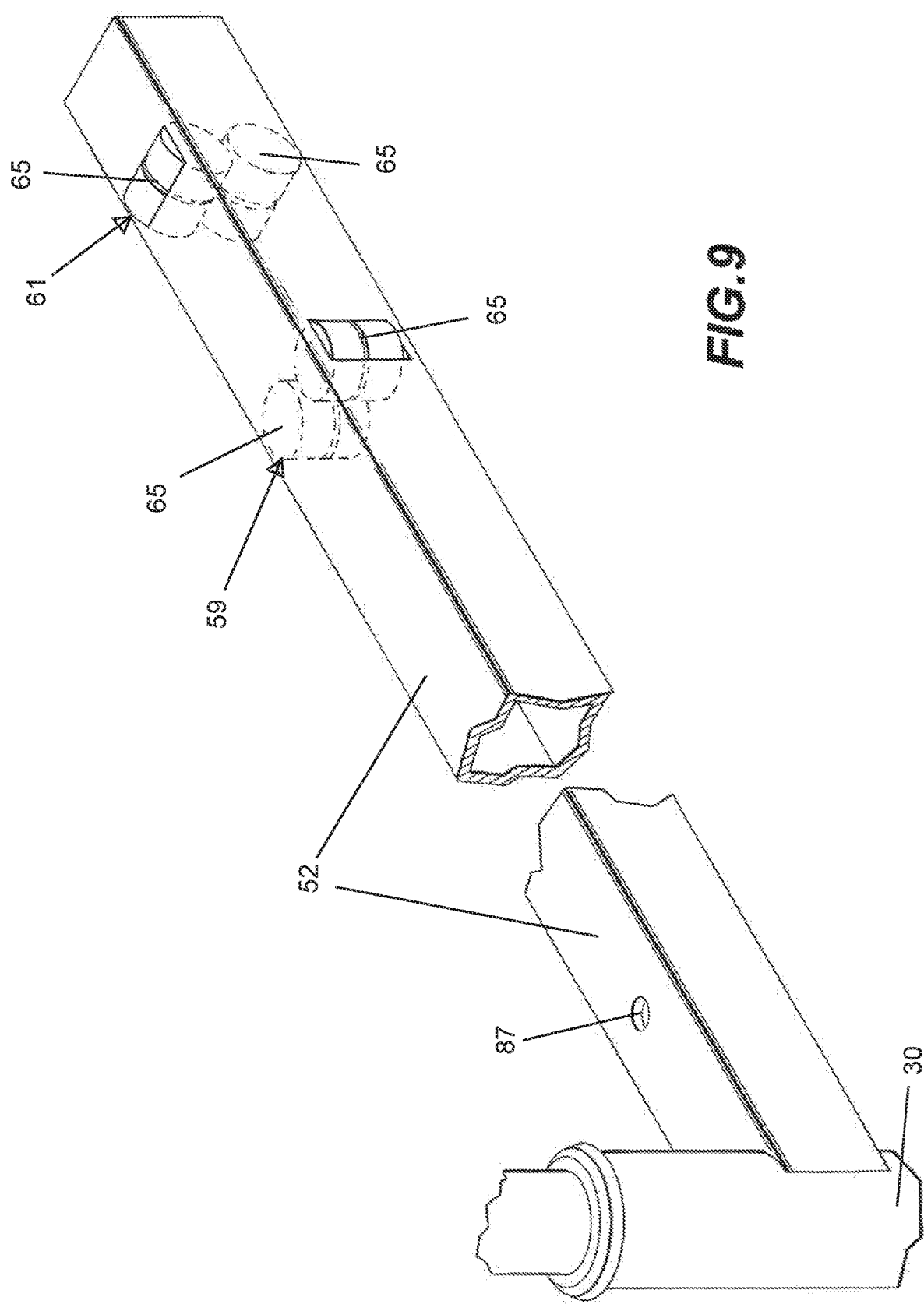
FIG. 9 is an enlarged perspective view of the telescoping bar of the bicycle in accordance with the present invention.
Figure 10:
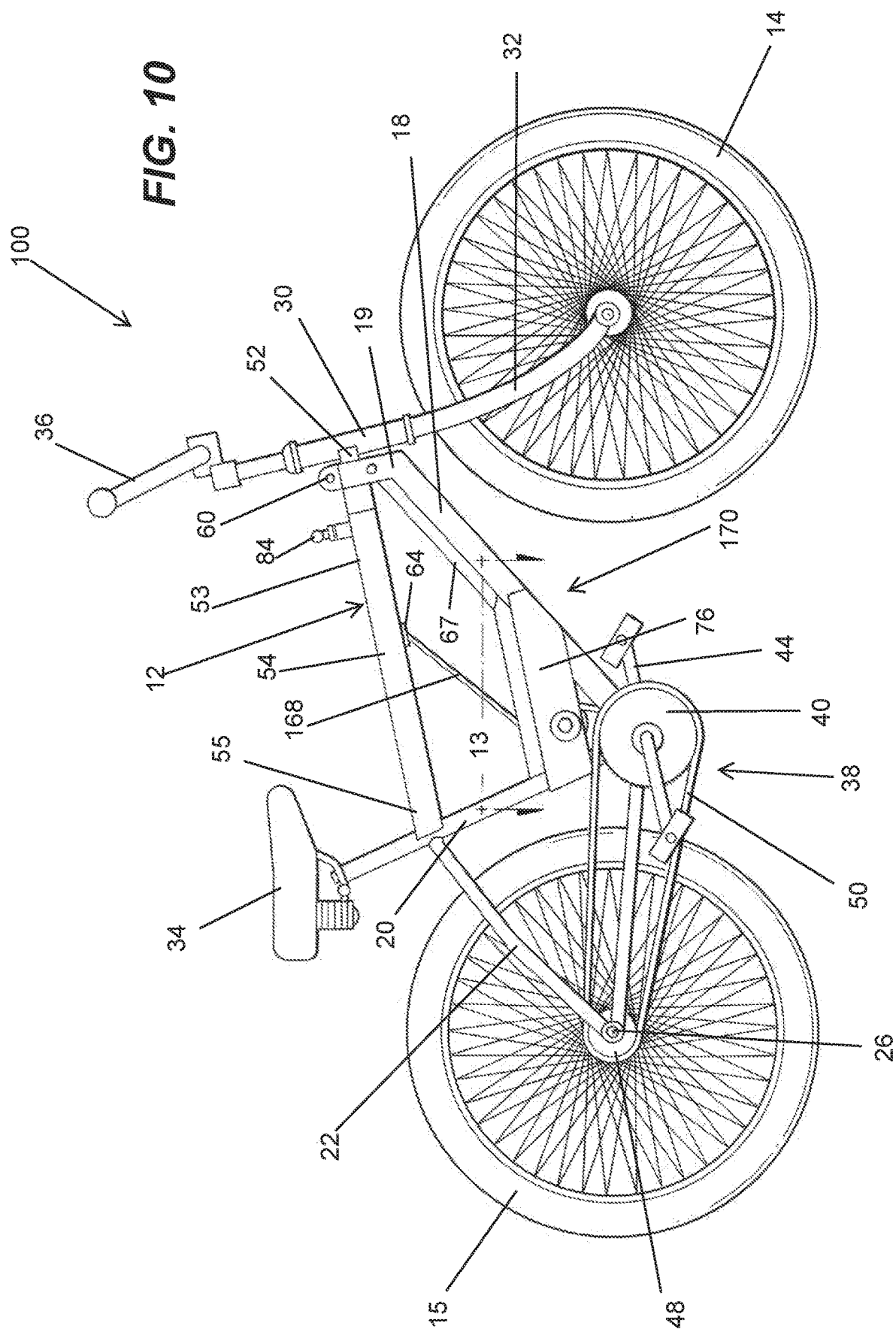
FIG. 10 is a right side elevation view of a second embodiment of a bicycle in accordance with the present invention.

The telescoping bar 52 is attached at its front end to the head tube 30. A bracket 64 is attached to the bottom of the telescoping bar 52 and extends through the slot 62 in the bottom of the outer channel member 54. In order to assure smooth sliding movement of the telescoping bar 52 within the outer channel member 54, a first set of front bearings including, side bearings 58 and top and bottom bearings 60, are attached to the outside of the outer channel member 54 near the front end 53 of the outer channel member 54 and protrude through bearing openings 56 (FIG. 5) into the outer channel member 54 in order to engage the telescoping bar 52. The front side bearings 58 and the front top and bottom bearings 60 are implemented by rollers 63 (FIGS. 7 and 8). Covers, such as cover 57 (FIG. 5) enclose the rollers 63 for the purpose of safety and appearance. A second set of rear bearings, including internal side bearings 59 and internal top and bottom bearings 61 are mounted on the telescoping bar 52 and engage the inside of the outer channel member 54. The rear internal side bearings 59 and the rear internal top and bottom bearings 61 are implemented by rollers 65 (FIGS. 7, 8, and 9). Alternatively, both the front set of bearings and the rear set of bearings could be mounted externally on the outer channel member 54 with openings to allow the bearings to engage the telescoping bar 52.

A lock 84 locks the telescoping bar 52 and the outer channel member 54 together when the bicycle is operated in conventional fashion without the extension and retraction of the telescoping bar 52 out of and into the outer channel member 54. The lock 84 comprises a lock body 85, mounted to the top of the outer channel member 54. A lock pin 86 has a handle 89 at one end, and the lock pin 86 is slidably mounted in the lock body 85. A spring (not shown) within the lock body 85 biases the lock pin 86 downward as shown in FIGS. 7 and 8. With the lock pin in its downward position shown in FIG. 7, the lock pin 86 extends through a locking hole 88 in the outer channel member 54 and into a locking hole 87 (FIG. 9) in the telescoping bar 52 thereby connecting the telescoping bar 52 and the outer channel member 54 together. In order to allow relative sliding movement between the telescoping bar 52 and the outer channel member 54, the locking pin 86 is retracted by the rider pulling up on the handle 89 and rotating the handle 89 90° to engage an internal boss that holds the locking pin in its retracted position (FIG. 8) against the spring bias.

Figure 6:
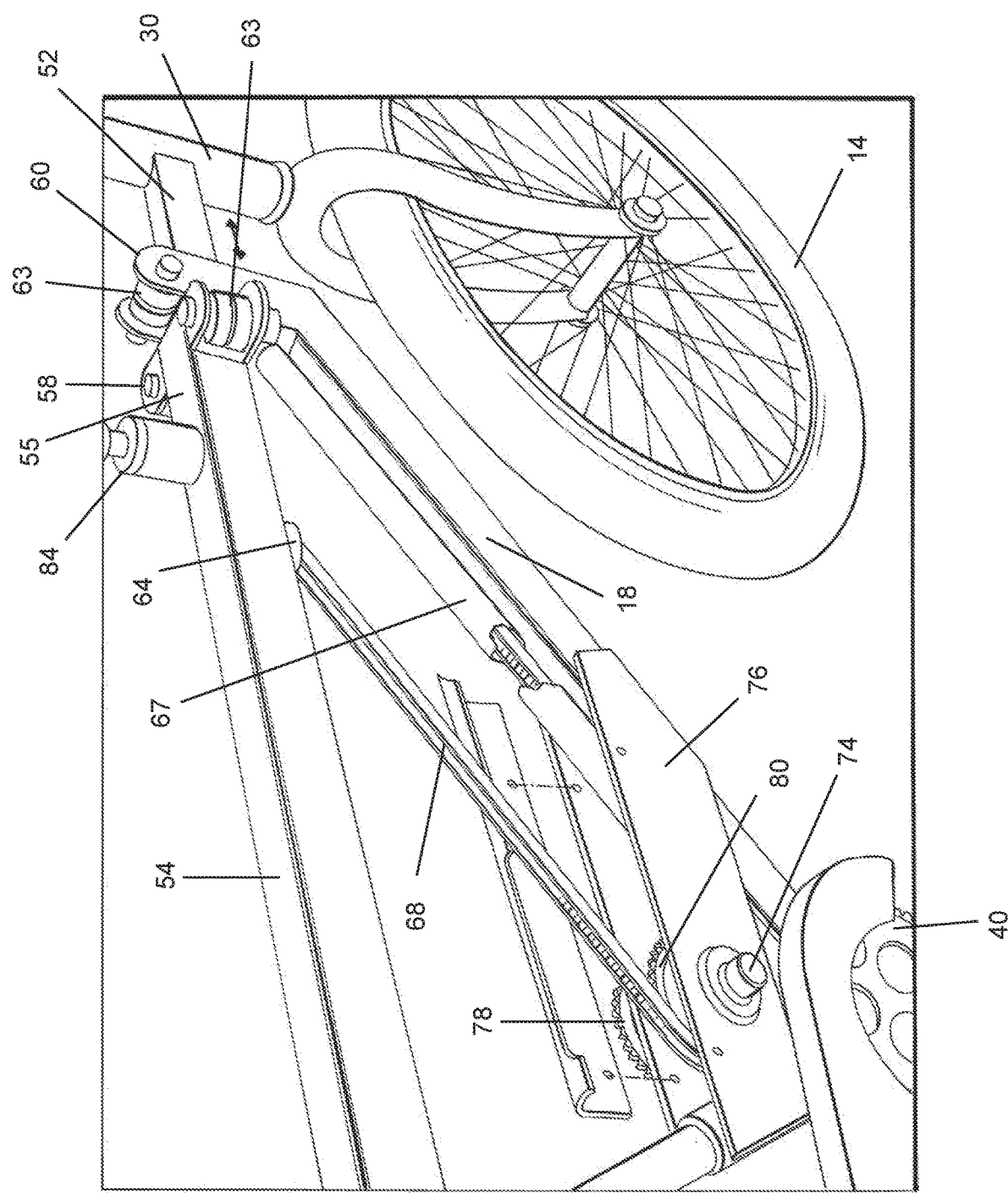
FIG. 6 is an enlarged right side perspective view of the bicycle, with the telescoping bar partially extended, in accordance with the present invention.

Travel of the telescoping bar 52 between an extended position (FIGS. 4, 6, and 8) and a retracted position (FIGS. 1, 2, 3, and 7) is limited by the bracket 64 engaging the ends of the slot 62 in the bottom of the outer channel member 54. Moreover, because the telescoping bar 52 can extend the full length of the outer channel member 54, the front outer bearings 58 and 60 and rear internal bearings 59 and 61 engage the telescoping bar 52 through the entire length of its travel from the retracted position to the extended position.

The auxiliary transmission 70 further includes a half chain 68 attached at one end to the bracket 64. The other end of the half chain 68 is connected to a tension spring 66 which in turn is connected to the upper end 19 of the down tube 18. The half chain 68 wraps around an upper freewheeling sprocket 80. The upper freewheeling sprocket 80 is rotatably mounted on intermediate shaft 74. The intermediate shaft 74 is carried by bracket 76, which in turn is mounted between the down tube 18 and the seat tube 20. An upper standard sprocket 78 is mounted to the intermediate shaft 74. The upper standard sprocket 78 is connected by a continuous chain 82 to a freewheeling lower sprocket 72. The freewheeling lower sprocket 72 is mounted to the pedal shaft 42. A spring tube 67 encloses the spring 66 and chain 68 between the upper end 19 of the down tube 18 and the upper freewheeling sprocket 80 for the purpose of safety and appearance.

When the telescoping bar 52 is retracted into the outer channel member 54 and the lock 84 locked, the bicycle 10 may be operated in the same way as a conventional bicycle with the rider providing the entire motive force by means of the pedals 46. In order to engage the auxiliary transmission 70 and thereby exercise the rider's arms and upper body and provide additional motive force to the bicycle 10, the rider unlocks the lock 84 and pushes forward on the handlebars 36 thereby extending the telescoping bar 52 forward out of the outer channel member 54. As the telescoping bar 52 moves forward out of the outer channel member 54, the bracket 64 attached to the telescoping bar 52 pulls the half chain 68 forward. As the half chain 68 moves forward, the half chain 68 rotates the upper freewheeling sprocket 80 counterclockwise when viewed in FIGS. 1, 3, 4, and 5. The rotation of the upper freewheeling sprocket 80 rotates upper standard sprocket 78 that is mounted to the common shaft 74. The rotation of the upper standard sprocket 78 in turn drives continuous chain 82 attached to lower freewheeling sprocket 72. Because the lower freewheeling sprocket 72 is attached to the pedal shaft 42, the motive force provided by the extension of the telescoping bar 52 is transmitted to the standard transmission 38 and therefore drives the rear wheel 15.

Other configurations can be used to convert the reciprocal motion of the telescoping bar 52 to rotary motion. For example, the telescoping bar 52 could be implemented as a rack with gear teeth on its lower side. A freewheeling pinion gear could be mounted just below the outer channel member 54 so that the teeth of the pinion gear extend through the slot 62 and engage the gear teeth on the lower side of the telescoping bar 52. As the telescoping bar 52 extends forward out of the outer channel member 54, the engaged pinion gear would rotate. The pinion gear could then be used to drive the auxiliary transmission 38 through an attached sprocket, such as sprocket 80. A torsion spring attached to the pinion gear could provide the reverse biased necessary to create resistance to the rider pushing the handlebars 36 forward and to pull the telescoping bar 52 back into the outer channel member 54. Other similar configurations can be employed to convert to the forward motion of the telescoping bar 52 into rotary motion to drive the auxiliary transmission 70.

Figure 11:
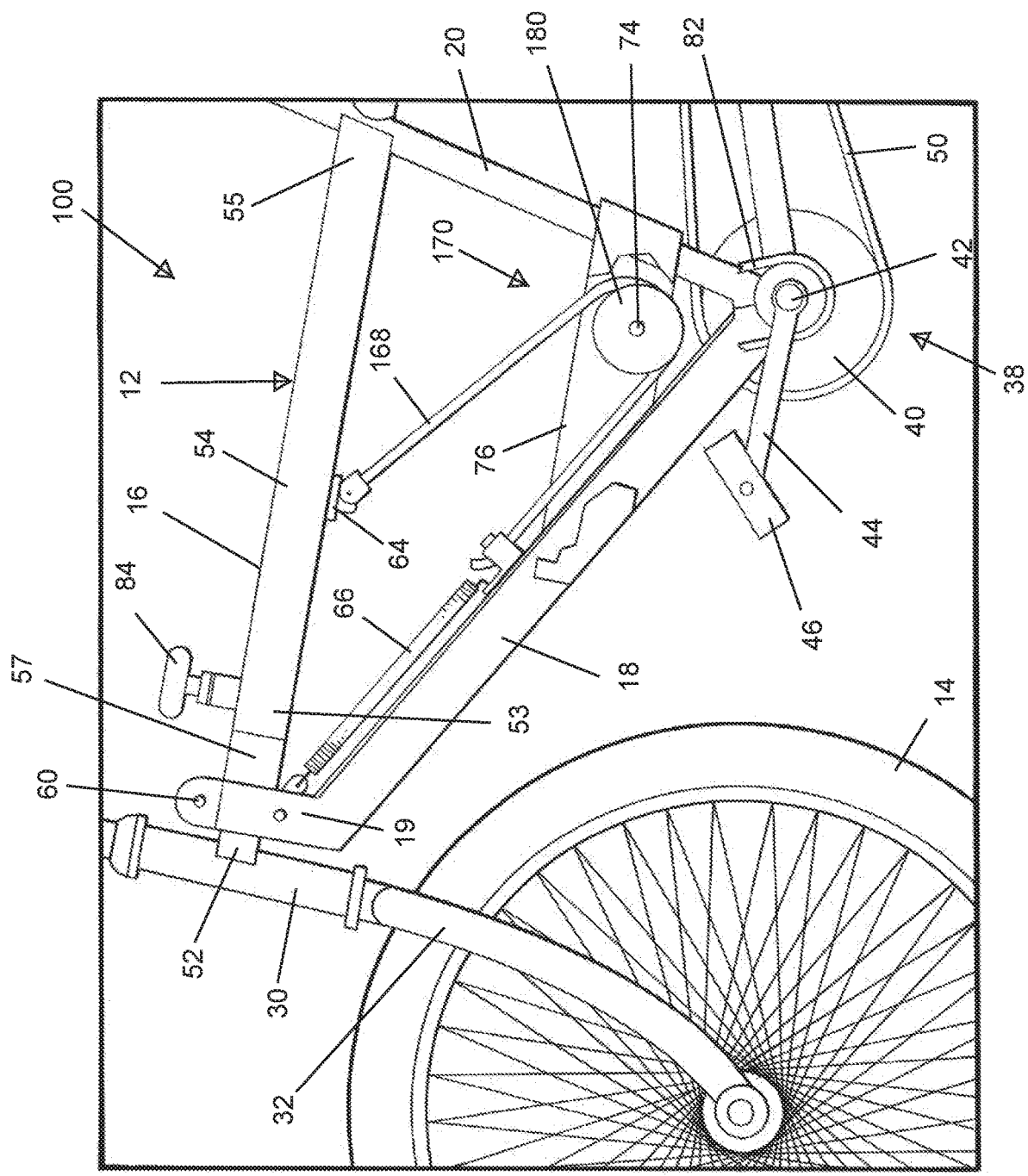
FIG. 11 is a left side elevation view of the bicycle with the telescoping bar retracted in accordance with the present invention.
Figure 12:
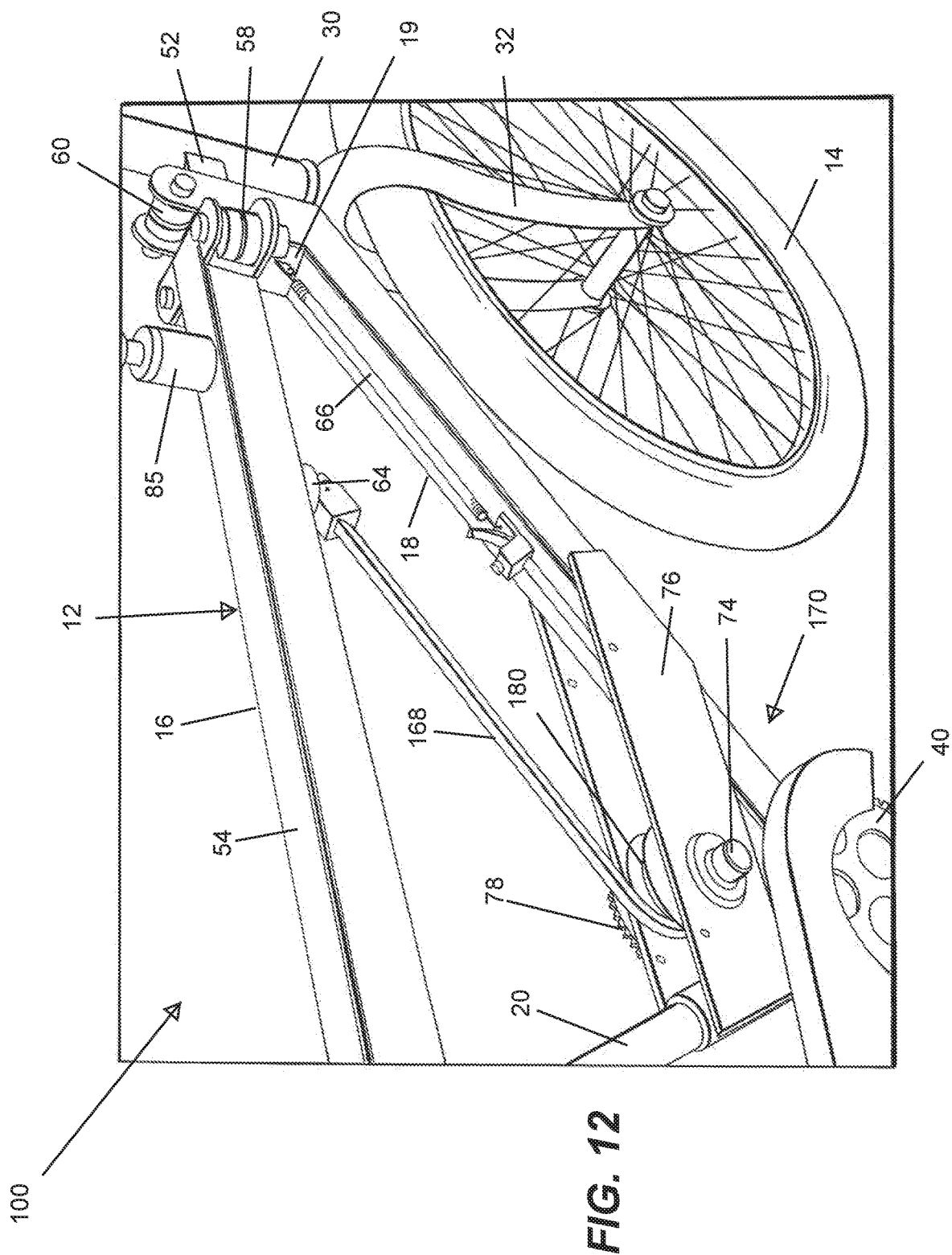
FIG. 12 is a right side perspective view of the bicycle with telescoping bar retracted in accordance with the present invention.
Figure 13:
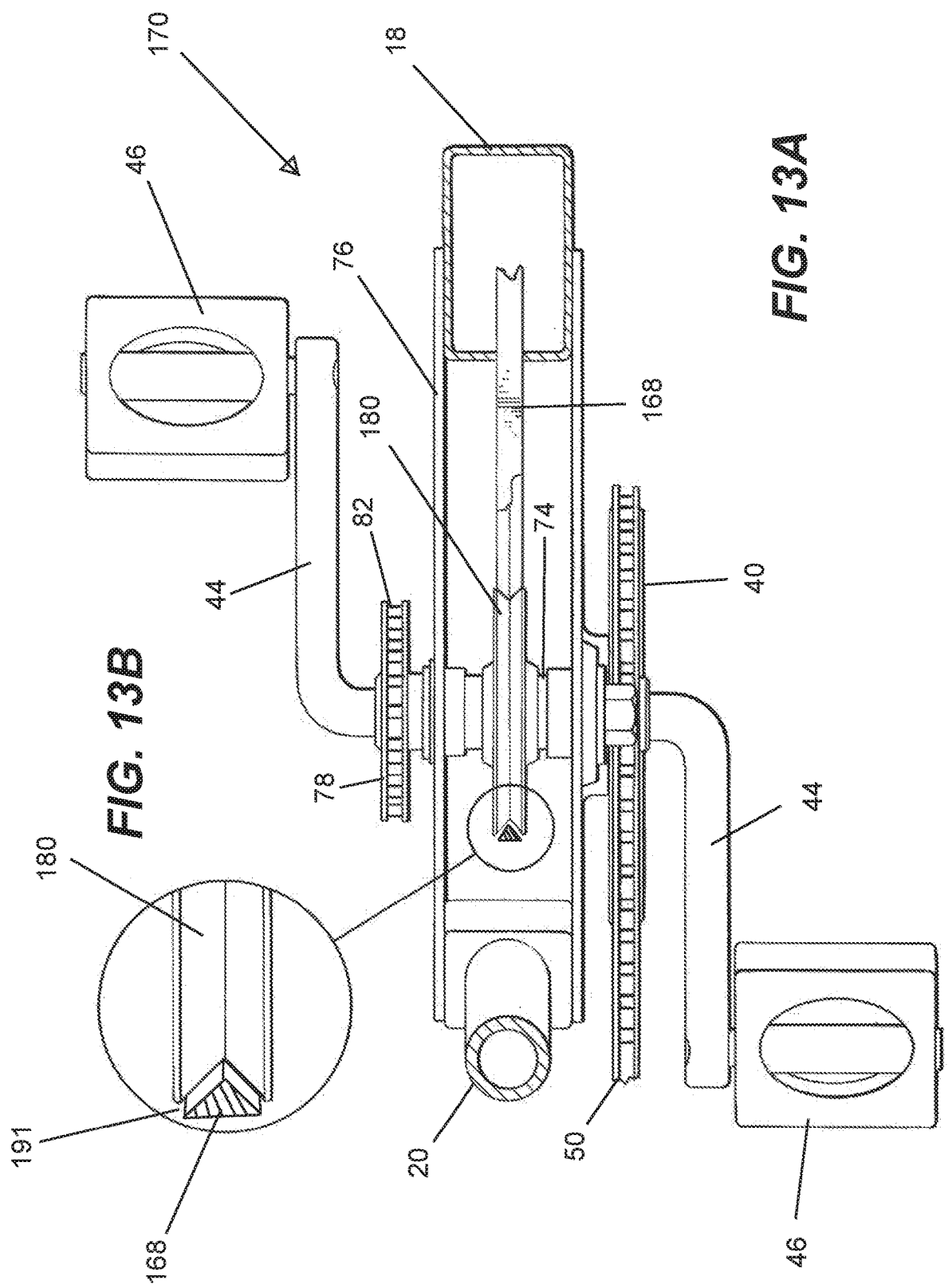
FIG. 13A is a top section view of the bicycle in accordance with the present invention has seen along line 13-13 of FIG. 10 with the telescoping bar retracted.
FIG. 13B is a detail view of a portion of the top section view of FIG. 13A.

A second embodiment of a bicycle 100 in accordance with the present invention is illustrated in FIGS. 10-13. The bicycle 100 is in all major respects the same as the bicycle 10 except the bicycle 100 has an altered auxiliary transmission 170. Particularly, the half chain 68 of the transmission 70 of the bicycle 10 is replaced by a half V-belt 168, and the upper freewheeling sprocket 80 is replaced by an upper freewheeling pulley 180 that engages the half V-belt 168. As shown in FIG. 11, the half V-belt 168 is attached at one end to the bracket 64 and at the other end to the spring 66. In FIG. 11, the spring tube 67 has been removed to show the spring 66. As illustrated in FIGS. 13A and 13B, the half V-belt 168 is sized so that when the telescoping bar 52 is in its retracted position, the half V-belt 168 is slightly slack around the freewheeling pulley 180 leaving a gap 191. The slack with the gap 191 is configured so that the freewheeling pulley 180 can rotate in the clockwise direction (FIG. 11) without engaging the half V-belt 168 when the bicycle is manually backed up.

Figure 14:
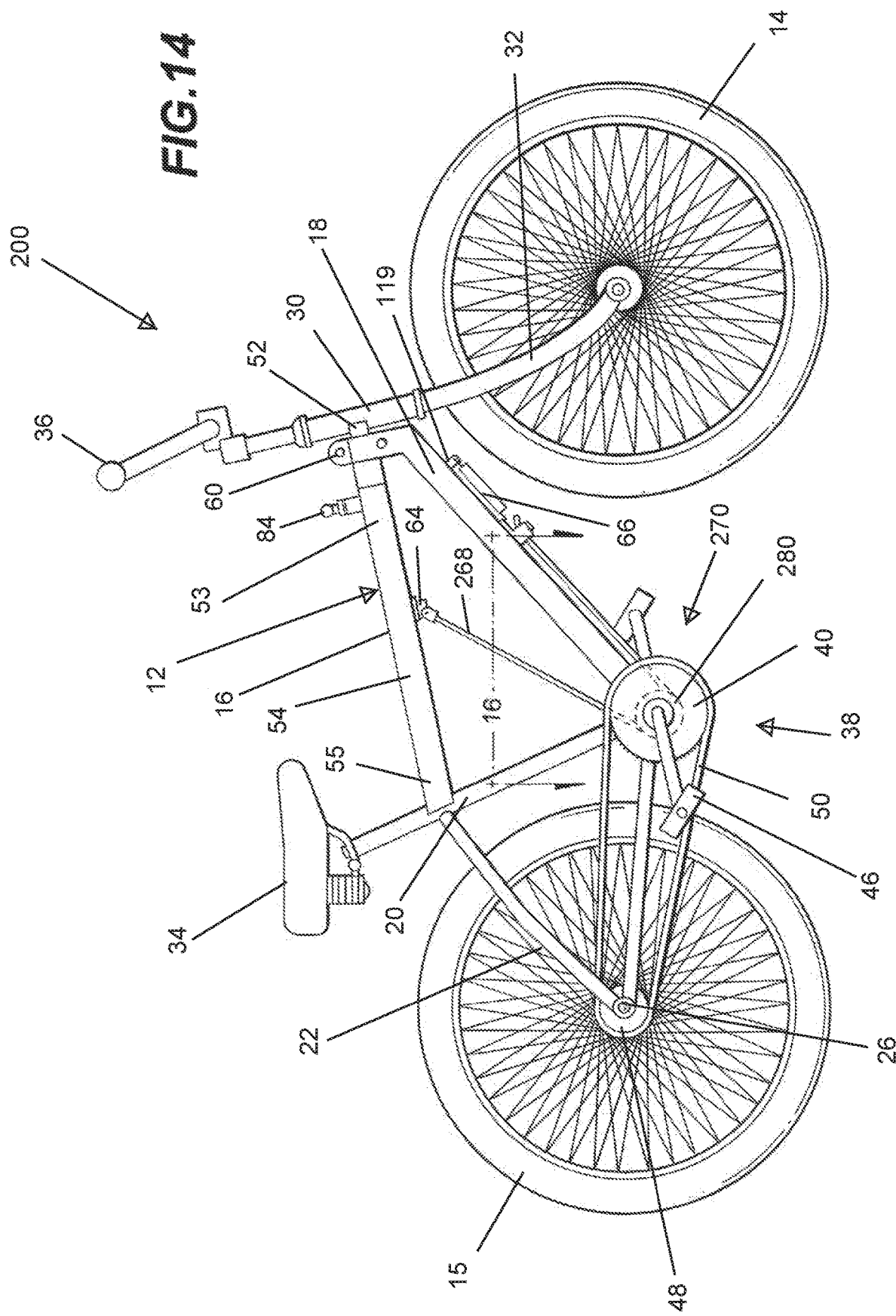
FIG. 14 is a right side elevation view of the bicycle with the telescoping bar retracted in accordance with the present invention.
Figure 15:
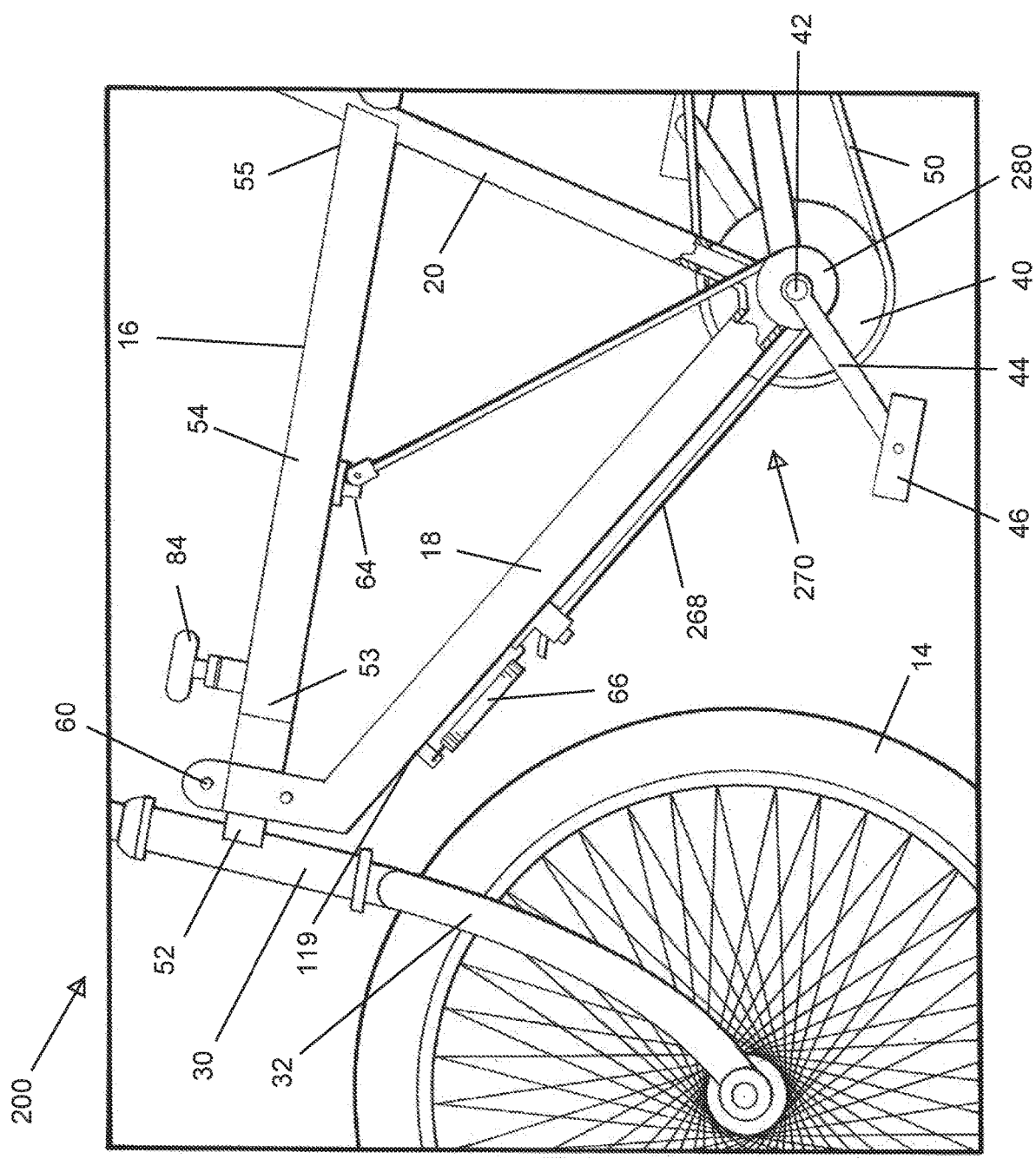
FIG. 15 is a left side perspective view of the bicycle with the telescoping bar retracted in accordance with the present invention.

A third embodiment of a bicycle 200 in accordance the present invention is illustrated in FIGS. 14-16. The bicycle 200 is in all major respects the same as the bicycle 10 except the bicycle 200 has an altered auxiliary transmission 270. Particularly, the auxiliary transmission includes a half V-belt 268 and freewheeling pulley 280. The freewheeling pulley 280 is mounted to the pedal shaft 42. The half V-belt 268 is attached at one end to the bracket 64 of the telescoping bar 52, looped around the freewheeling pulley 280, and attached at the other end to one end of the spring 66. The other end of the spring 66 is attached to the upper end 119 of the down tube 18 along the underside of the down tube 18 as shown in FIG. 15. As illustrated in FIGS. 16A and 16B, the half V-belt 268 is sized so that when the telescoping bar 52 is in its retracted position, the half V-belt 268 is slightly slack around the freewheeling pulley 280 leaving a gap 291. The slack with the gap 291 is configured so that the freewheeling pulley 280 can rotate in the clockwise direction (FIG. 15) without engaging the half V-belt 280 when the bicycle is manually backed up.

While this invention has been described with reference to preferred embodiments thereof, it is to be understood that variations and modifications can be affected within the spirit and scope of the invention as described herein and as described in the appended claims.

I claim:

1. For a bicycle having a frame, the frame including a crossbar, a down tube, seat tube, a head tube engaging handlebars, at least two wheels mounted to the frame, and a standard chain transmission, the standard chain transmission including a pedal chain sprocket mounted to a pedal shaft and driven by pedals and cranks, a driven wheel sprocket connected to a drive wheel of the bicycle, and a chain connecting the pedal chain sprocket to the driven wheel sprocket, an auxiliary bicycle transmission for the bicycle comprising:
   a. the crossbar comprising:
   i. a telescoping bar attached at a front end to the head tube;
   ii. a channel member attached at a rear end to the seat tube, and
   wherein the telescoping bar and channel member are slidably engaged with respect to each other so that the telescoping bar reciprocates between an extended position and a retracted position with respect to the channel member when the handlebars are moved forward and backward and wherein the reciprocating motion of the telescoping bar is converted to rotary motion for driving the driven wheel sprocket.

2. The auxiliary bicycle transmission of claim 1, wherein the auxiliary bicycle transmission comprises a chain, wherein a first end of the chain is connected to the telescoping bar, wherein a second end of the chain is connected by a tension spring to an upper end of the down tube, and wherein the chain wraps around a first freewheeling sprocket, and wherein the freewheeling sprocket is operatively connected to the pedal chain sprocket.

3. The auxiliary transmission of claim 2, wherein the first freewheeling sprocket is connected to the pedal chain sprocket by an intermediate shaft on which the first freewheeling sprocket and a first standard sprocket are mounted, a second freewheeling sprocket mounted on the pedal shaft, and a continuous chain connecting the first standard sprocket to the second freewheeling sprocket.

4. The auxiliary bicycle transmission of claim 1, wherein the auxiliary bicycle transmission comprises a V-belt, wherein a first end of the V-belt is connected to the telescoping bar, wherein a second end of the V-belt is connected by a tension spring to an upper end of the down tube, and wherein the V-belt wraps around a first freewheeling pulley, and wherein the first freewheeling pulley is operatively connected to the pedal chain sprocket.

5. The auxiliary bicycle transmission of claim 4, wherein the V-belt is slack around the freewheeling pulley when the telescoping bar is in the retracted position with respect to the channel member.

6. The auxiliary transmission of claim 4, wherein the first freewheeling pulley is connected to the pedal chain sprocket by an intermediate shaft on which the first freewheeling pulley and a first standard sprocket are mounted, a second freewheeling sprocket mounted on the pedal shaft, and a continuous chain connecting the first standard sprocket to the second freewheeling sprocket.

7. The auxiliary bicycle transmission of claim 6, wherein the V-belt is slack around the freewheeling pulley when the telescoping bar is in the retracted position with respect to the channel member.

8. The auxiliary transmission of claim 4, wherein the first freewheeling pulley is mounted on the pedal shaft.

9. The auxiliary bicycle transmission of claim 8, wherein the V-belt is slack around the freewheeling pulley when the telescoping bar is in the retracted position with respect to the channel member.

10. A bicycle frame with frame members comprising:
a. a fixed length down tube with an upper end;
b. a seat tube having an upper end;
c. a head tube engaging handlebars; and
d. a crossbar comprising:
  i. a telescoping bar attached at a front end to the head tube;
  ii. a channel member attached at a rear end to the upper end of the seat tube and attached at a front end to the upper end of the down tube, and
  iii. a spring attached the telescoping bar,
  wherein the telescoping bar and channel member are slidably engaged with respect to each other so that the telescoping bar reciprocates between an extended position and a retracted position with respect to the channel member when the handlebars are moved forward and backward, wherein the handlebars and head tube move to the extended position against a force created by the spring and return to the retracted position by the force created by the spring, wherein the spring is attached to at least one frame member, and wherein the at least one frame member is the down tube.

* * * * *